(12) United States Patent
Kitaura et al.

(10) Patent No.: US 10,252,387 B2
(45) Date of Patent: Apr. 9, 2019

(54) BALANCER MECHANISM FOR ROTATING SHAFT

(71) Applicant: PASCAL ENGINEERING CORPORATION, Itami-shi, Hyogo (JP)

(72) Inventors: Ichiro Kitaura, Itami (JP); Takashi Ninomiya, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 0 days.

(21) Appl. No.: 15/552,140

(22) PCT Filed: Feb. 1, 2016

(86) PCT No.: PCT/JP2016/052871
§ 371 (c)(1),
(2) Date: Aug. 18, 2017

(87) PCT Pub. No.: WO2016/143408
PCT Pub. Date: Sep. 15, 2016

(65) Prior Publication Data
US 2018/0036850 A1    Feb. 8, 2018

(30) Foreign Application Priority Data

Mar. 12, 2015   (JP) .................. 2015-049364

(51) Int. Cl.
*B23Q 11/00* (2006.01)
*B23Q 1/72* (2006.01)
(Continued)

(52) U.S. Cl.
CPC ............ *B23Q 11/0021* (2013.01); *B23Q 1/72* (2013.01); *B23Q 11/00* (2013.01); *F16F 15/16* (2013.01); *F16F 15/22* (2013.01)

(58) Field of Classification Search
CPC ....... F16F 15/16; F16F 15/22; B23Q 11/0021; B23Q 1/72; B23Q 11/00
(Continued)

(56) References Cited

U.S. PATENT DOCUMENTS 5,163,336 A * 11/1992 Biondetti ................ B06B 1/162
74/61
2006/0185470 A1    8/2006 Machida et al.

FOREIGN PATENT DOCUMENTS

| EP | 1677028 A1 | 7/2006 |
| JP | 11-77460 A | 3/1999 |

(Continued)

*Primary Examiner* — David H Bollinger
(74) *Attorney, Agent, or Firm* — Norris McLaughlin, P.A.

(57) ABSTRACT

A balancer mechanism for a rotating shaft is configured to prevent deviation of the axis of the rotating shaft. The balancer mechanism (20) has an assistance torque generation device (21) for generating an assistance torque. The assistance torque generation device (21) includes a cam member (24) fixed to the rotating shaft (4), a cam follower member (25) and a gas spring (27). The balancer mechanism has a reaction force generation device (22) provided for generating, a balancing moment on the rotating shaft that cancels out a tilting moment that tilts the rotating shaft (4) around a bearing member (9) in a direction to separate it from the assistance torque generation device (21) and which is caused by the biasing force of the gas spring (27).

6 Claims, 5 Drawing Sheets

(51) Int. Cl.
*F16F 15/16* (2006.01)
*F16F 15/22* (2006.01)

(58) Field of Classification Search
USPC .......................................... 74/573.1; 464/180
See application file for complete search history.

(56) References Cited

FOREIGN PATENT DOCUMENTS

| | | |
|---|---|---|
| JP | 2000-234508 A | 8/2000 |
| WO | 2005/038291 A1 | 4/2005 |
| WO | 2008/029453 A | 3/2008 |

* cited by examiner

BALANCER MECHANISM FOR ROTATING SHAFT

TECHNICAL FIELD

The present invention relates to a balancer mechanism for a rotating shaft, and in particular relates to a balancer mechanism for a rotating shaft that comprises an assistance mechanism for alleviating unbalanced torque (i.e. unbalanced moment) acting on the rotating shaft supported by a shaft support member.

BACKGROUND ART

Conventionally, various types of mechanical devices such as indexer devices and robot arms etc. are per se known that drive a driven member to swing such as a table unit or an arm together with a rotating shaft freely rotatably supported on a shaft support member via a bearing member, by linking the driven member to the rotating shaft, and by making the rotating shaft rotate with a rotational drive means such as an electrically operated servo motor or the like.

Now, since an unbalanced torque acts via the driven member on the rotating shaft around its rotational center due to the eccentric load that originates in the dead weight of the driven member itself and in the dead weight of an accessory such as a workpiece etc. that is fixed to the driven member, accordingly it is necessary rotationally to drive the rotating shaft against the resistance of the unbalanced torque. Therefore, in general, in order to alleviate such unbalanced torque acting on the rotating shaft, a balancer mechanism for the rotating shaft including a gas spring or a hydraulic cylinder is often installed to the shaft support member.

For example, in a rotating table device described in Patent Document #1, a construction is disclosed in which one end portion of a crank member is attached to a free end of a rotating shaft that is linked to a table unit, a cylinder body of a balancer cylinder is freely rotatably attached to the other end portion of the crank member, and the tip end portion of a rod that is installed in the cylinder body so as to advance and retract freely is pivotally attached to an installation surface.

In a construction such as that of Patent Document #1 in which a balancer cylinder whose main body is supported by trunnions is installed, there is the problem that the mechanical device becomes undesirably large in size. Accordingly, in the balancer mechanism for a rotating shaft described in Patent Document #2, a construction is disclosed in which a circular cam plate is attached to a free end of a rotating shaft that rotates a table unit, and a cam follower member at the end of an output rod of a gas spring is contacted against the outer circumferential surface of the cam plate. However, with the constructions disclosed in these Patent Documents #1 and #2, there is the problem that entry of foreign substance is quite easy, since the cylinder body and the rotating components are exposed to the exterior.

Furthermore, with a construction such as that of Patent Document #2 in which a cam mechanism is provided at a free end of the rotating shaft, since load is applied via the cam mechanism to the free end of the rotating shaft, accordingly the angle of displacement of the rotating shaft becomes great, and there is a fear that the accuracy of machining of the workpiece and the operational accuracy of the arm may be deteriorated. Accordingly, in the rotating shaft support mechanism disclosed in Patent Document #3, a construction is disclosed in which a cam plate is attached between bearings that support the rotating shaft, a swing arm is provided whose one end portion is linked to a shaft support member and whose other end portion is linked to an end of an output rod of a gas spring, and a cam follower member that is contacted against the outer circumferential surface of the cam plate is attached to the center portion of the swing arm. With this construction of Patent Document #3, since the cylinder body and the swing arm are housed internally to the shaft support member, accordingly there is no ingress of foreign substance, but it is necessary to remove the shaft support member when exchanging the gas spring, so that the working cost increases.

PRIOR ART DOCUMENT

Patent Document

Patent Document #1: Japanese Laid-Open Patent Publication 2005-28539.
Patent Document #2: PCT Publication WO2005/038291.
Patent Document #3: Japanese Laid-Open Patent Publication 2007-71383.

SUMMARY OF INVENTION

Technical Problem

Now, recently, with mechanical devices such as described above that drive driven members to swing, in many cases, in order to make the device more compact and enhance its rotational accuracy, as a bearing member (i.e. a bearing) for supporting the rotating shaft, a cross roller bearing is employed in which a plurality of cylindrical rollers are arranged alternatingly and mutually orthogonally between an inner ring that is fixed to the rotating shaft of the bearing member and an outer ring that is fixed to the shaft support member. In particular, with such a cross roller bearing, it is possible to make the mechanical device more compact, since it is possible to support load acting in all directions with a single bearing.

However since, when a cross roller bearing is employed as a bearing member, the cost is high as compared with a conventional ball bearing, and since, in order to obtain high precision rotational motion, it is necessary to adjust the bearing clearance when installing the cross roller bearing to the mechanical device and also to apply a preload pressure, accordingly, in a case such as that of the rotating shaft support mechanism of Patent Document #3 in which cross roller bearings are applied to a construction in which a single rotating shaft is supported by a plurality of bearings, there are the problems that fitting these cross roller bearings necessitates significant labor and the cost is increased, and moreover that the size of the resulting mechanical device is increased.

Accordingly, when a construction such as that of the balancer mechanism for a rotating shaft of Patent Document #2 is adopted in which a rotating shaft is supported by a single bearing member, since in this construction, as described above, the cam mechanism is provided at the free end of the rotating shaft, accordingly a tilting moment is undesirably applied and tilts the rotating shaft, so that the rotational accuracy decreases due to deviation of the axis of the rotating shaft, and this causes undesirable problems such as deterioration of the accuracy of machining of the workpiece and reduction of the operating accuracy of the arm. No construction aimed at solving this type of problem is disclosed in any of Patent Documents #1 through #3.

Objects of the present invention are: to provide a balancer mechanism for a rotating shaft that is capable of preventing deviation of the axis of the rotating shaft without increase of the number of bearing members that support the rotating shaft; to provide a balancer mechanism for a rotating shaft that is capable simply and easily of employing a cross roller bearing as a bearing member; and so on.

Means To Solve The Problem

The balancer mechanism for a rotating shaft of the first aspect is a balancer mechanism for a rotating shaft for alleviating unbalanced torque acting on the rotating shaft that is freely rotationally supported by a shaft support member via a bearing member, from a member that is supported by the rotating shaft, wherein there is provided an assistance torque generation means for generating an assistance torque that mutually cancels out at least a part of the unbalanced torque; the assistance torque generation means comprising a cam member that is fixed to the rotating shaft, a cam follower member that contacts against and follows the cam member, and a biasing means for applying assistance torque to the rotating shaft via the cam member by biasing the cam follower member toward the cam member; and further comprising a reaction force generation means, by the biasing force of the biasing means, for generating a balancing moment that mutually cancels out a tilting moment that tilts the rotating shaft, around the bearing member as a center, in a direction away from the assistance torque generation means, and that is provided on an opposite side of the rotating shaft from the assistance torque generation means.

The balancer mechanism for a rotating shaft of second aspect according to the first aspect, wherein the reaction force generation means comprises a roller member that contacts against and follows the rotating shaft, and a biasing member that elastically biases the roller member toward the rotating shaft.

The balancer mechanism for a rotating shaft of the third aspect according to the first aspect, wherein the reaction force generation means comprises a second cam member that is fixed to the rotating shaft, a second cam follower member that contacts against and follows the second cam member, and a second biasing means for biasing the second cam follower member toward the second cam member, and, along with generating the balancing moment, also generates a portion of the assistance torque.

The balancer mechanism for a rotating shaft of fourth aspect according to the first through third aspects, wherein the biasing means of the assistance torque generation means comprises a gas spring.

The balancer mechanism for a rotating shaft of fifth aspect according to fourth aspect, wherein a rotary joint is housed internally to the rotating shaft.

The balancer mechanism for a rotating shaft of sixth aspect according to fourth aspect, wherein the rotating shaft is a rotating shaft that rotatably supports a table unit of an indexer device on which a workpiece is detachably installed.

Advantages of Invention

According to the first aspect, by generating a balancing moment on the rotating shaft with the reaction force generation means, it is possible mutually to cancel out tilting moment, generated by the biasing force of the biasing means of the assistance torque generation means, that tilts the rotating shaft, around the bearing member as a center, in a direction to remove it from the assistance torque generation means, so that it is possible to prevent inclination of the rotating shaft and deviation of the axis of the rotating shaft.

Thus, since it is possible to prevent inclination of the rotating shaft due to the assistance torque generation means by providing the reaction force generation means on an opposite side of the rotating shaft from the bearing member, accordingly, along with it being possible to prevent deterioration of the accuracy for processing the workpiece and deterioration of the operational accuracy of the arm, also it is possible to prevent inclination of the rotating shaft without installation of any additional bearing member, and therefore it is possible to implement reduction of the number of bearing members to be installed, and it is thus possible, in a simple and easy manner, to employ a cross roller bearing for the bearing member.

According to the second aspect, by employing a spring member or the like as the biasing member, it is possible to provide a reaction force generation means that is low in cost and moreover is compact.

According to the third aspect, it is possible to increase the assistance torque by constructing the reaction force generation means in a similar manner to the assistance torque generation means.

According to the fourth aspect, it is possible to employ a biasing means whose spring constant is low, so that it is possible to reduce fluctuations of the biasing force due to the stroke to the maximum possible extent.

According to the fifth aspect, by connecting a mechanical device to which the balancer mechanism for a rotating shaft is installed to a hydraulic device via the rotary joint, it becomes possible to implement automation of the mechanical device.

According to the sixth aspect, when raising the table unit of the indexer device from its lowermost position by swinging it, along with generating an assistance torque, it is also possible to generate a balancing moment.

DESCRIPTION OF EMBODIMENTS

In the following, embodiments for implementing the invention will be explained on the basis of drawings. The first and second embodiments are examples of cases in which a balancer mechanism for a rotating shaft is applied to an indexer device, to which a workpiece on which machining is to be performed by a machine tool is detachably attached.

First Embodiment

First, the overall structure of an indexer device 1 will be explained.

Figure 1:
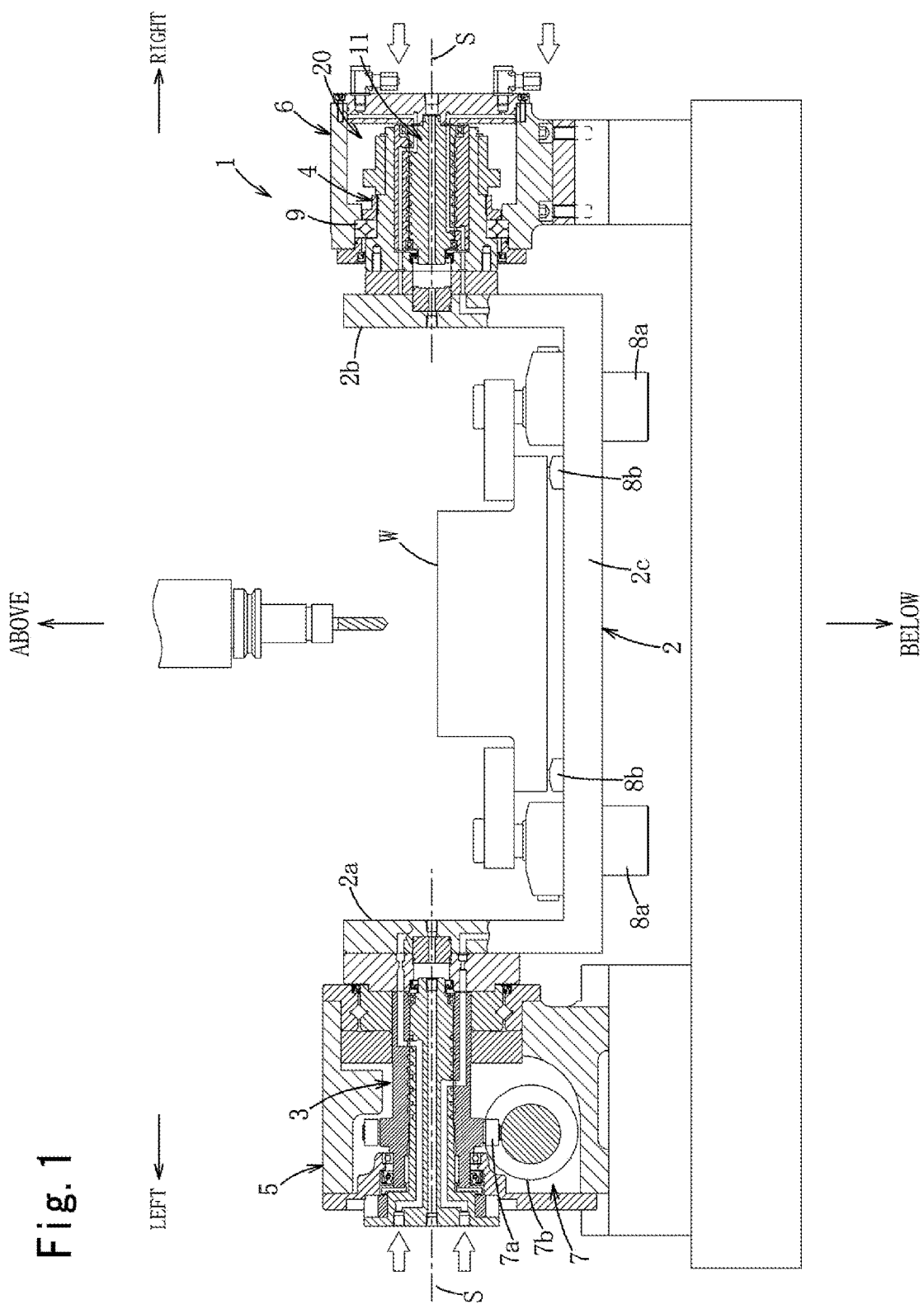
FIG. 1 is a schematic sectional view of an indexer device according to the first embodiment of the present invention.

As shown in FIG. 1, the indexer device 1 comprises a table unit 2, a pair of left and right rotating shafts 3, 4 that are connected to the left and right ends of the table unit 2 and that moreover rotatably support the table unit 2, a left shaft support member 5 that supports the left rotating shaft 3 so that it can rotate freely, a right shaft support member 6 that supports the right rotating shaft 4 so that it can rotate freely, a rotational drive mechanism 7 that rotationally drives the table unit 2 and the rotating shafts 3, 4 around a horizontal rotational axis S, a rotating shaft balancer mechanism 20, and so on. The upward, downward, leftward, and rightward directions in the following explanation refer to the upward, downward, leftward, and rightward directions in FIG. 1.

The table unit 2 comprises a left arm portion 2a that is integrally linked to the right end portion of the left rotating shaft 3 and that extends downward orthogonally to the rotational axis S for a predetermined length, a right arm portion 2b that is integrally linked to the left end portion of the right rotating shaft 4 and that extends downward orthogonally to the rotational axis S for a predetermined length, and a table body 2c of which the left and right end portions are respectively integrally connected to the lower end portion of the left arm portion 2a and to the lower end portion of the right arm portion 2b.

A plurality of clamp mechanisms 8a and a plurality of base members 8b are provided on the table body 2c of the table unit 2, and a workpiece W is detachably mounted on the table body 2c via these clamp mechanisms 8a and these base members 8b. After the table unit 2 has been rotated to a target rotational position by the rotational drive mechanism 7 and has been brought to a stopped state, machining is performed on the workpiece W with a tool that is installed to the main shaft of a machine tool.

The state shown in FIG. 1 in which the table body 2c is positioned at its lowermost position in a horizontal attitude is the home position of the table unit 2, and during the home position the rotational shafts 3, 4 at the left and right sides are also in their home rotational positions, with the position of the rotating shaft 4 shown in FIGS. 2 through 5 also being its home rotational position.

The rotational drive mechanism 7 is provided to the left shaft support member 5. The rotational drive mechanism 7 comprises a turret 7a fixed to the left rotating shaft 3, a roller gear cam 7b that is meshed with the turret 7a, an electrically operated servo motor (not shown) capable of rotationally driving the roller gear cam 7b. Drive force is inputted from the electrically operated servo motor (not shown in the figures) via the roller gear cam 7b and the turret 7a to the left rotating shaft 3, and thereby the table unit 2 is driven to swing.

Here, if the center of gravity of the workpiece W fixed to the table unit 2 and to the table body 2c and the rotational axis S of the left and right rotational shafts 3, 4 do not coincide with one another, then an unbalanced torque is generated on the rotating shafts 3, 4 due to the eccentric load of the table unit 2 and the workpiece W. The rotating shaft balancer mechanism 20 that will be described hereinafter is a device that is provided on the right shaft support member 6, in order to generate an assistance torque on the right rotating shaft 4 that mutually cancels out all, or a portion of, the unbalanced torque.

Figure 2:
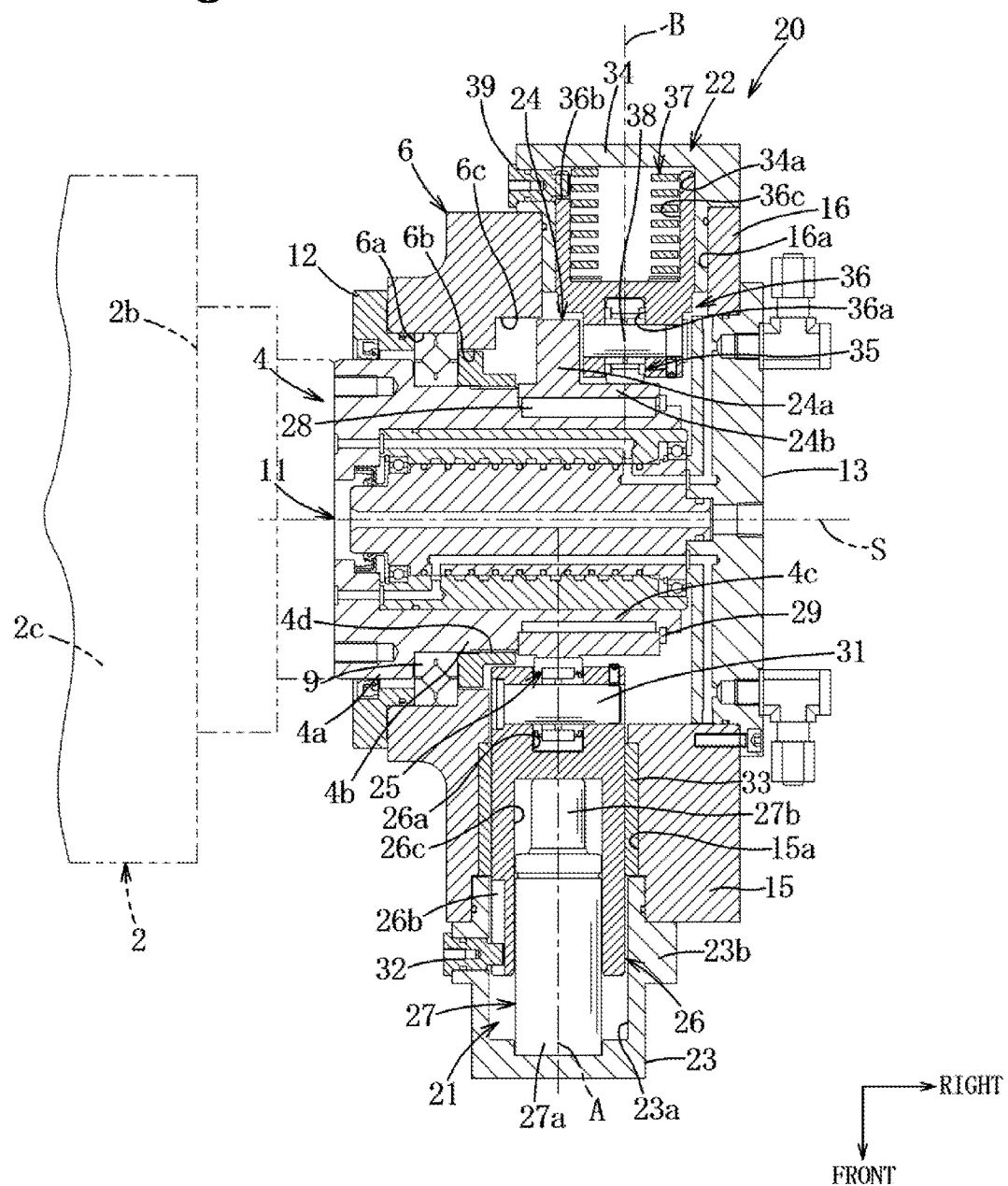
FIG. 2 is a horizontal sectional view of a rotating shaft, a shaft support member, and a rotating shaft balancer mechanism according to the first embodiment.
Figure 3:
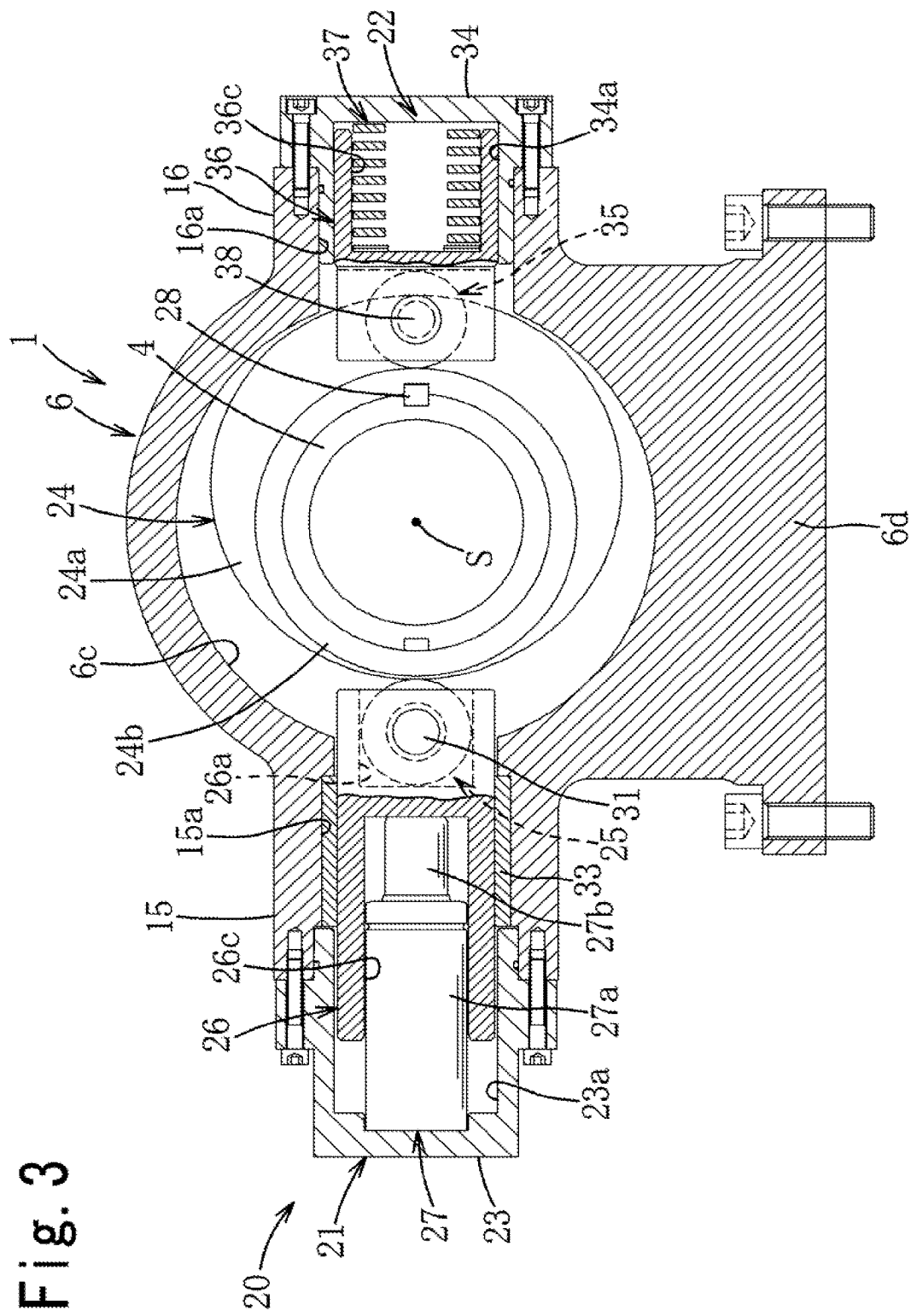
FIG. 3 is a vertical sectional view of the rotating shaft, the shaft support member, and the rotating shaft balancer mechanism according to the first embodiment 1.

Next, the right rotating shaft 4 will be explained. As shown in FIGS. 1 through 3, the rotating shaft 4 is supported at the left end portion of the shaft support member 6 via a single bearing member 9. From the left toward the right, the rotating shaft 4 includes a large diameter shaft portion 4a, a medium diameter shaft portion 4b that is formed to have a smaller diameter than the large diameter shaft portion 4a and to which the bearing member 9 is installed, and a small diameter shaft portion 4c that is formed to have a smaller diameter than the medium diameter shaft portion 4b and on which a cam member 24 is installed.

The rotating shaft 4 is generally built as a tubular member, and a rotary joint 11 is housed in the interior of the tubular member for connecting a plurality of hydraulic passage systems. The rotary joint 11 is connected to a source for supply of pressurized fluid, and pressurized fluid (for example, pressurized oil) is supplied from the hydraulic supply source to the plurality of clamp mechanisms 8a via a plurality of hydraulic hoses, the rotary joint 11, a plurality of hydraulic passages formed in the table unit 2.

Next, the right shaft support member 6 will be explained. As shown in FIGS. 1 through 3, in the interior of the shaft support member 6, from the left toward the right, there are formed a medium diameter hole 6a in which the bearing member 9 is installed, a small diameter hole 6b that is formed to have a smaller diameter than that of the medium diameter hole 6a, and a large diameter hole 6c that is formed to have a larger diameter than those of the small diameter hole 6b and the medium diameter hole 6a. A ring member 12 in the internal circumferential portion of which a seal member is installed is attached to the left end portion of the shaft support member 6, and a cover plate 13 is attached to the right end portion of the shaft support member 6. A fixing portion 6d at the lower end portion of the shaft support member 6 (refer to FIG. 3) is fixed to an installation surface with a plurality of bolt members.

Furthermore, a first mounting cylinder portion 15 for installation of an assistance torque generation means 21 is formed in a horizontal orientation on a front side wall portion of the peripheral wall portion of the shaft support member 6, and a second mounting cylinder portion 16 for installation of a reaction force generation means 22 is formed in a horizontal orientation on a rear side wall portion of the peripheral wall portion of the shaft support member 6, on the opposite side with respect to the first mounting cylinder portion 15, and with the rotational axis S between them.

A first through hole 15a that extends in a direction orthogonal to that of the large diameter hole 6c is formed in the first mounting cylinder portion 15. And a second through hole 16a that extends in a direction orthogonal to that of the large diameter hole 6c is formed in the second mounting cylinder portion 16. The central axis B of the second mounting cylinder portion 16 is formed in a position that is offset with respect to the central axis A of the first mounting cylinder portion 15, and that is deviated rightward from the axis A of the first mounting cylinder portion 15.

Next, the bearing member 9 will be explained. As shown in FIG. 2, the bearing member 9 is built as a per se known cross roller bearing, and comprises an inner ring that is fixed to the medium diameter shaft portion 4b of the rotating shaft 4, an outer ring that is fixed in the medium diameter hole 6a of the shaft support member 6, and a plurality of cylindrical rollers that are arranged between the inner ring and the outer ring so as to be alternatingly mutually orthogonal.

The bearing member 9 is provided between the rotating shaft 4 and the shaft support member 6 by the outer ring of the bearing member 9 being fitted into the medium diameter hole 6a of the shaft support member 6 and being sandwiched by the ring member 12 against the step portion between the medium diameter hole 6a and the small diameter hole 6b, and by the inner ring of the bearing member 9 being fitted over the medium diameter shaft portion 4b of the rotating shaft 4 and being sandwiched against the annular support member 4d by the step portion between the medium diameter shaft portion 4b and the large diameter shaft portion 4a.

Next, the rotating shaft balancer mechanism 20 that is characteristic will be explained. As shown in FIGS. 1 through 3, the rotating shaft balancer mechanism 20 is provided to the right shaft support member 6, and, along with alleviating unbalanced torque generated on the rotating shaft 4 when the table unit 2 is stopped, also alleviates tilting moment applied to the rotating shaft 4 that acts to tilt the rotating shaft 4.

The rotating shaft balancer mechanism 20 comprises an assistance torque generation means 21 that generates assistance torque for mutually canceling out at least a part of the unbalanced torque, and a reaction force generation means 22 that generates a balancing moment that mutually cancels out a tilting moment, due to the biasing force of a gas spring 27 of the assistance torque generation means 21, that tilts the rotating shaft 4 around the bearing member 9 as a center and acts in the direction to remove it from the assistance torque generation means 21.

Next, the assistance torque generation means 21 will be explained. As shown in FIGS. 2 and 3, the assistance torque generation means 21 is provided to the first mounting cylinder portion 15, in a horizontally oriented attitude in front of the central portion of the shaft support member 6. The assistance torque generation means 21 is a device that applies assistance torque to the rotating shaft 4 from in front thereof, in a direction that is orthogonal to the rotational axis S and in the horizontal plane that includes the rotational axis S.

A member 23 that defines a tubular reception hole having a bottom is installed in the opening side of the first through hole 15a of the first mounting cylinder portion 15. In other words, the end of the tubular portion of the reception hole definition member 23 is inserted from the front into the first through hole 15a, with an annular convex portion 23b that is formed on the exterior of an intermediate portion of the reception hole definition member 23 being brought into contact with the front end portion of the first mounting cylinder portion 15, and the reception hole definition member 23 is then fixed to the front end portion of the first mounting cylinder portion 15 by a plurality of bolts. A gas spring reception hole 23a is formed in the reception hole definition member 23, with a cylinder body 27a of the gas spring 27 being received therein.

The assistance torque generation means 21 comprises a cam member 24 that is fixed to the rotating shaft 4, a cam follower member 25 that is contacted against and follows the cam member 24, an output member 26 to which the cam follower member 25 is mounted, the gas spring 27 (i.e. biasing means) that applies assistance torque to the rotating shaft 4 via the cam member 24 by elastically biasing the cam follower member 25 toward the cam member 24.

The cam member 24 comprises a cam plate 24a that is approximately elliptical, and a tubular portion 24b that is integrally formed at the center portion of the cam plate 24a so as to pierce therethrough and that constitutes a portion of the rotating shaft 4. The cam plate 24a is positioned on the left side portion of the external peripheral portion of the tubular portion 24b. And the cam plate 24a is fixed to the small diameter shaft portion 4c of the rotating shaft 4 via the tubular portion 24b, so as to be eccentric with respect to the rotational axis S.

When the table unit 2 is at its lowermost position shown in FIG. 1, then, as shown in FIGS. 2 and 3, the cam plate 24a is set and positioned in an attitude in which the distance from the rotational axis S to the cam follower member 25 becomes a minimum, and the tubular portion 24b is fitted over and fixed in this position to the exterior of the small diameter shaft portion 4c of the rotating shaft 4. The tubular portion 24b is prevented by a key member 28 from rotating with respect to the rotating shaft 4, and is prevented by a C shaped stop ring 29 from shifting in the direction of the rotational axis S.

The cam follower member 25 is built as a roller member having a cylindrical surface on its external peripheral portion, and is pressed against the outer peripheral surface of the cam plate 24a by a large biasing force due to the gas spring 27. The cam follower member 25 is housed in a housing recess portion 26a that is formed at the tip end portion (i.e. at the rear end portion) of the output member 26, and is attached via a horizontal pin member 31 so that it can rotate freely.

The output member 26 is inserted into a guide shaft reception member 33 that is installed in the first through hole 15a, so as to be capable of shifting freely back and forth therein. The output member 26 is regulated so as not to be capable of rotating around the axis A of the gas spring 27 by a regulating groove 26b that is formed on the external peripheral portion of its front end portion, and by a regulating pin 32 that is fixed to the reception hole definition member 23 and that is engaged with the regulating groove 26b. A gas spring insertion hole 26c that opens in the forward direction is formed in the output member 26.

The gas spring 27 comprises a cylinder main body 27a, a gas storage chamber (not shown) formed in the cylinder body 27a and filled with a high pressure compressed gas (for example, nitrogen gas at 10 to 20 MPa), and a rod member 27b that is inserted into the gas storage chamber so as to slide freely therein and that receives the pressure of the compressed gas therein and is thereby advanced rearward.

The head side end wall portion of the cylinder body 27a is fixed against the bottom portion of the gas spring reception hole 23a of the reception hole definition member 23 (i.e. against its outer end wall). The rod side end wall portion of the cylinder body 27a is inserted into the gas spring insertion hole 26c of the output member 26, and, due to the end of the rod member 27b being contacted against the bottom portion (i.e. its far end wall) of the gas spring insertion hole 26c, the output member 26 is biased toward the rotational axis S by the biasing force of the gas spring 27. It is possible simply and easily to exchange the output member 26 and/or the gas spring 27 by removing the reception hole definition member 23 in the forward direction.

According to the swing position of the table unit 2 (i.e. the rotational position of the rotating shaft 4), a contact angle is created at the contact portion that is tilted with respect to the vertical plane of the outer circumferential surface of the cam plate 24a where it is in contact with the cam follower member 25, and an assistance torque is applied to the cam plate 24a due to the contact angle and due to the pressure described above.

And, although the shown shape of the cam member 24 is only one example, the distance from the rotational axis S to the contact portion with the cam follower member 25 becomes a minimum in the state of FIG. 3, gradually increases according to rotation of the rotating shaft 4 from the state of FIG. 3, and reaches a maximum in the state when the shaft has been rotated through 180°.

The contact angle described above gradually increases while the rotating shaft 4 rotates through approximately 90° from the state of the cam plate 24a shown in FIG. 3, and thereafter the contact angle described above gradually decreases as the rotating shaft 4 continues to rotate to 180°. In other words: the assistance torque becomes maximum at the position where the table unit 2 has been rotated through approximately 90° from its state shown in FIG. 1 (i.e. from its rotational position of 0°); the assistance torque gradually decreases as the table unit 2 moves away from this rotational position of 90° toward the rotational position of 0° or toward the rotational position of 180°; and the assistance torque becomes zero at the rotation position of 0° or at the rotational position of 180°. It is possible to vary the contact angle by changing the cam shape of the cam plate 24a, and thereby it is possible to vary the characteristics of the assistance torque. Since the load on the electrically operated servo motor of the rotational drive mechanism 7 is reduced due to this assistance torque, accordingly it becomes possible to obtain beneficial effects with regard to energy saving and reduction of the size of the electrically operated servo motor.

Next, the reaction force generation means 22 will be explained. As shown in FIGS. 2 and 3, the reaction force generation means 22 is provided to the second mounting cylinder portion 16 on the rear side of the right side portion of the shaft support member 6, in a horizontally oriented attitude. The reaction force generation means 22 is a device that causes a balancing moment to act on the free end of the rotating shaft 4 from the rear, in a direction in the horizontal plane that includes the rotational axis S and that is orthogonal to the rotational axis S.

A tubular cylindrical hole definition member 34 having a bottom is installed to the opening side of the second through hole 16a of the second mounting cylinder portion 16. In other words, a tubular portion of the cylindrical hole definition member 34 is inserted into the second through hole 16a from the rear, and a base end flange portion of the cylindrical hole definition member 34 is contacted against the rear end portion of the second mounting cylinder portion 16 and is fixed to the rear end portion of the second mounting cylinder portion 16 by a plurality of bolts. A cylindrical hole 34a, in which an output member 36 is installed, is formed in the cylindrical hole definition member 34. It is possible to exchange the output member 36 and/or the spring member 37 simply and easily by removing the cylindrical hole definition member 34 rearward.

In other words, the reaction force generation means 22 is provided at the opposite side of the rotating shaft 4 from the assistance torque generation means 21, and moreover at the opposite side of the bearing member 9 with respect to the cam plate 24a of the cam member 24. The reaction force generation means 22 is provided in a state in which its axis (i.e. its central axis B) is offset from the axis of the assistance torque generation means 21 (i.e. from its central axis A).

The reaction force generation means 22 comprises a roller member 35 that contacts against and follows the rotating shaft 4, an output member 36 to which the roller member 35 is installed, a spring member 37 (i.e. biasing member) that generates a balancing moment on the rotating shaft 4 via the roller member 35 by elastically biasing the roller member 35 toward the rotating shaft 4, and so on.

The roller member 35 is pressed against the outer peripheral surface of the rotating shaft 4 by the biasing force of the spring member 37, and is housed in a housing recess 36a that is formed at the tip end portion (i.e. at the front end portion) of the output member 36, and is attached thereto via a horizontal pin member 38 so as to be able to rotate freely.

The output member 36 is inserted into the cylindrical hole 34a of the cylindrical hole definition member 34 so as to be movable freely forward and backward therein. The output member 36 is regulated, so that it cannot rotate around the axis B of the reaction force generation means 22, by a regulating groove 36b that is formed on the outer peripheral portion of its rear end portion, and by a regulating pin 39 that is fixed to the cylindrical hole definition member 34 and is engaged in the regulating groove 36b. A spring housing recess portion 36c which opens rearward is formed in the output member 36.

The spring member 37 is installed in a compressed state between the cylindrical hole definition member 34 and the output member 36. The rear end portion of the spring member 37 is contacted against the bottom end wall of the cylindrical hole 34a while the front end portion of the spring member 37 is contacted against the bottom end wall of the spring housing recess portion 36c, so that a balancing moment is applied to the right end portion of the small diameter shaft portion 4c of the rotating shaft 4 due to the output member 36 being elastically biased toward the rotational axis S. Since the assistance torque generation means 21 and the reaction force generation means 22 are housed within the shaft support member in this manner, accordingly it is possible to prevent ingress of foreign matter, so that the durability is enhanced.

Next, the operation of the rotating shaft balancer mechanism 20 and the advantages thereof will be explained.

Due to the biasing force of the gas spring 27, a tilting moment M1 is generated on the rotating shaft 4 that tilts the rotating shaft 4 around the bearing member 9 as center in the direction to remove the rotating shaft 4 away from the assistance torque generation means 21. This tilting moment M1 may be calculated according to the equation: tilting moment M1=L1×F1; where L1 is the distance between the bearing member 9 and the axis A of the gas spring 27, and F1 is the biasing force of the gas spring 27 in the direction orthogonal to the rotational axis S.

On the other hand, the balancing moment M2 generated by the reaction force generation means 22 in order to oppose the tilting moment M1 may be calculated according to the equation: balancing moment M2=L2×F2; where L2 is the distance between the bearing member 9 and the axis B of the spring member 37, and F2 is the biasing force of the spring member 37 in the direction orthogonal to the rotational axis S. Accordingly, it is possible mutually to cancel out the moment M1 described above by setting L2 and F2 to appropriate values in advance, so that the balancing moment M2=the tilting moment M1.

As described above, by generating the balancing moment on the rotating shaft 4 with the reaction force generation means 22, it is possible mutually to cancel out the tilting moment around the bearing member 9 as a center generated by the biasing force of the biasing means of the assistance torque generation means 21 that tilts the rotating shaft 4 in the direction to remove it away from the assistance torque generation means 21, so that it is possible to prevent inclination of the rotating shaft 4, and it is possible to prevent deviation of the axis of the rotating shaft 4.

Since it is possible to prevent inclination of the rotating shaft 4 due to the assistance torque generation means 21 by providing the reaction force generation means 22 on the opposite side of the rotating shaft from the bearing member 9, and since therefore, along with it being possible to prevent deterioration of the accuracy for machining the workpiece W and of the operational accuracy of the arm, it is also possible to prevent inclination of the rotating shaft 4 even without installing an additional bearing member 9, accordingly it is possible to reduce to unity the number of bearing members 9 to be installed, so that it is possible to employ a single cross roller bearing as the bearing 9 in a simple and easy manner.

Furthermore, since the reaction force generation means 22 comprises the roller member 35 that contacts against and follows the rotating shaft 4 and the spring member 37 (i.e. the biasing member) that elastically biases this roller member 35 toward the rotating shaft 4, accordingly, by using the spring member 37 or the like as the biasing member, it is possible to built a compact reaction force generation means 22 that is low in cost.

Yet further, since the biasing means of the assistance torque generation means 21 is built by utilizing the gas spring 27, accordingly it is possible to provide a biasing means whose spring constant is low, so that fluctuation of the biasing force according to the stroke can be reduced to the greatest possible extent.

Moreover, since the rotary joint 11 is housed in the interior of the rotating shaft 4, accordingly it becomes possible to implement automation of the mechanical device to which the rotating shaft balancer mechanism 20 is installed by connecting the mechanical device to a hydraulic device via the rotary joint 11.

Even further, since in the indexer device 1 the rotating shaft 4 is a rotating shaft 4 that rotatably supports the table unit 2 to which the workpiece W is detachably installed, accordingly, when the table unit 2 of the indexer device 1 is moved upward from its lowermost position by swinging, it is possible to generate the assistance torque and also to generate the balancing moment.

Second Embodiment

Next, a rotating shaft balancer mechanism 20A according to a second embodiment will be explained, in which the rotating shaft balancer mechanism 20 according to the first embodiment is partially altered. While the reaction force generation means 22 of the first embodiment is constructed by utilizing a compression type spring member 37, the reaction force generation means 22A of the second embodiment is constructed by utilizing a cam mechanism and a gas spring 45.

Figure 4:
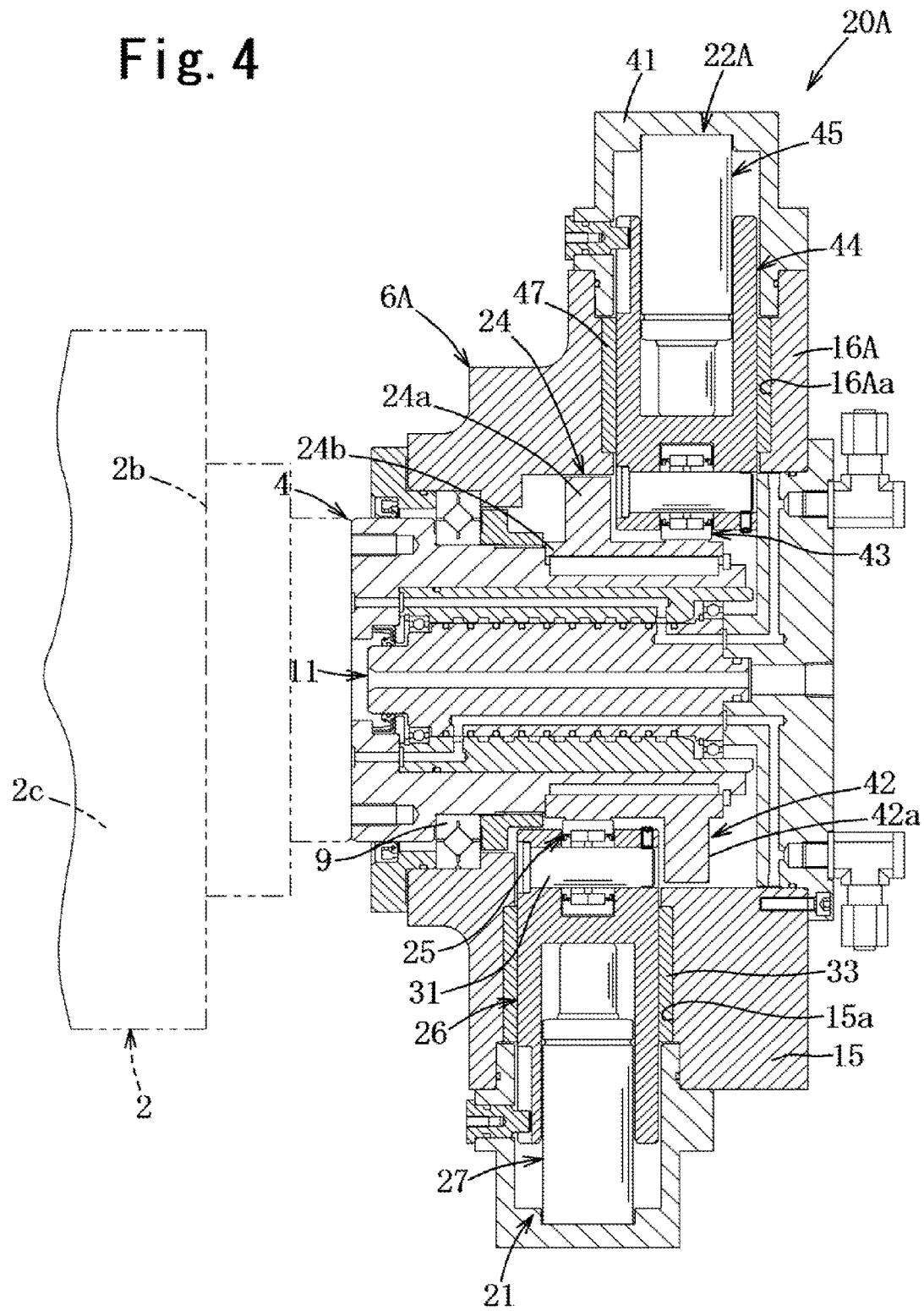
FIG. 4 is a horizontal sectional view of a rotating shaft, a shaft support member, and a rotating shaft balancer mechanism according to the second embodiment.
Figure 5:
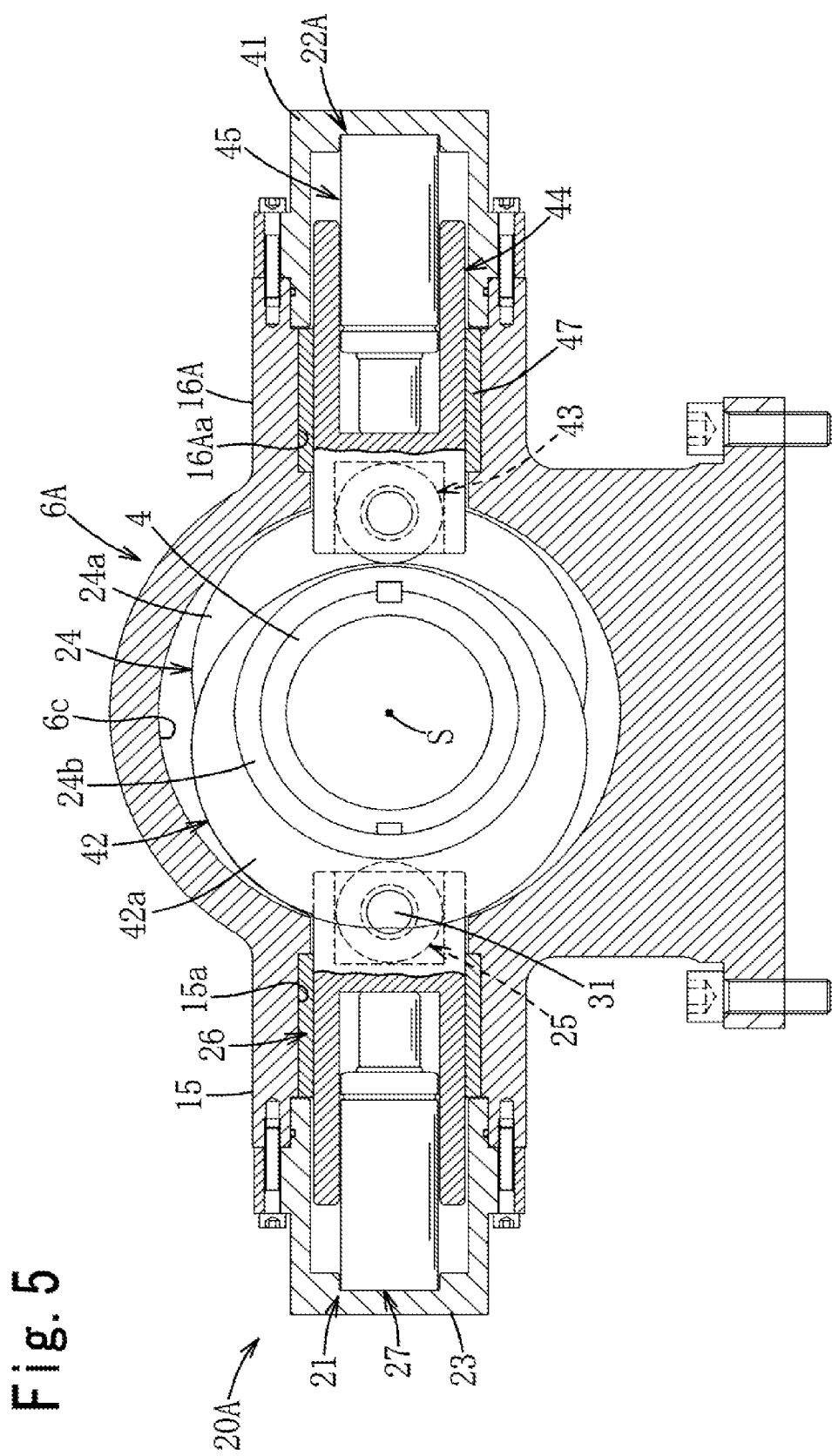
FIG. 5 is a vertical sectional view of the rotating shaft, the shaft support member, and the rotating shaft balancer mechanism according to the second embodiment.

As shown in FIGS. 4 and 5, a second mounting cylinder portion 16A is formed in a horizontal orientation on a rear side wall portion of the peripheral wall portion of the shaft support member 6A, for installation of a reaction force generation means 22A on the opposite side of the rotational axis S from the first mounting cylinder portion 15. The second mounting cylinder portion 16A has a similar construction to that of the first mounting cylinder portion 15. A second reception hole definition member 41 that is fundamentally similar to the reception hole definition member 23 is installed in the opening end of a second through hole 16Aa of the second mounting cylinder portion 16A. And a guide shaft reception member 47, in which a second output member 44 is inserted so as to slide freely, is installed in the inner circumferential portion of the second through hole 16Aa.

The reaction force generation means 22A is provided to the second mounting cylinder portion 16A in a horizontally oriented attitude at the rear side of the right side portion of the shaft support member 6A. The reaction force generation means 22A is a device that, along with generating a balancing moment on the free end of the rotating shaft 4 from the rear in a direction in the horizontal plane that includes the rotational axis S and that also is orthogonal to the rotational axis S, also generates a portion of the assistance torque. It should be understood that the reaction force generation means 22A fundamentally has a construction similar to that of the assistance torque generation means 21, and, along with the balancing moment, also applies a part of the assistance torque to the right end portion of the small diameter shaft portion 4c of the rotating shaft 4.

In other words, the reaction force generation means 22A comprises a second cam member 42 that is fixed to the rotating shaft 4, a second cam follower member 43 that contacts against and follows the second cam member 42, a second output member 44 to which the second cam follower member 43 is installed, and a second gas spring 45 (i.e.biasing means) that, by elastically biasing the second cam follower member 43 toward the second cam member 42, applies the balancing moment and the assistance torque to the rotating shaft 4 via the second cam member 42.

The second cam member 42 comprises an approximately elliptical second cam plate 42a, and a tubular portion 24b that is formed integrally at the center portion of the cam plate 42a and that also serves commonly as a cam member 24 of the assistance torque generation means 21. The cam plate 42a is positioned on the right side portion of the tubular portion 24b. And the second cam plate 42a is fixed to the tubular portion 24b in a state of being rotated through 180° with respect to the cam plate 24a around the rotational axis S as a center.

According to the swinging position of the table unit 2 (according to the rotational position of the rotating shaft 4), a contact angle is created at the contact portion that is inclined with respect to the vertical plane of the outer circumferential surface of the cam plate 42a that makes contact with the cam follower member 43, and, along with an assistance torque being applied to the cam plate 42a due to this contact angle and due to the pressure described above, also a balancing moment is applied to the rotating shaft 4 in the direction orthogonal to the rotational axis S.

Since, according to this construction, the reaction force generation means 22A comprises the second cam member 42 that is fixed to the rotating shaft 4, the second cam follower member 43 that contacts against and follows the second cam member 42, and the second gas spring 45 that elastically biases the second cam follower member 43 toward the second cam member 42, and since thereby, along with generating the balancing moment, also a part of the assistance torque is generated, accordingly it is possible to increase the assistance torque by adopting a similar construction for the reaction force generation means 22A as that for the assistance torque generation means 21. The other structures, operation, and beneficial effects of the second embodiment are the same as those of the first embodiment described above, and accordingly explanation thereof is omitted.

Next, variant embodiments in which the above first and second embodiments are partially varied will be explained.

[1] While, in the first and second embodiments described above, the rotating shaft balancer mechanisms 20, 20A were installed to the right shaft support members 6, the present invention is not necessarily particularly limited to use of this construction; it would also be acceptable for the rotational drive mechanism 7 to be installed to the left side shaft support member 5 .

[2] While the reaction force generation means 22, 22A described above were provided on the opposite side of the bearing member 9 with respect to the cam plate 24a of the cam member 24, the use of this construction is not to be considered as being necessarily limitative; provided that the reaction force generation means is provided approximately on the opposite side of the rotating shaft 4 from the assistance torque generation means, it would also be acceptable to arrange for the central axis B of the reaction force generation means 22, 22A to be provided so as to coincide with the central axis A of the assistance torque generation means 21; or, alternatively, it would also be acceptable for it to be provided between the bearing member 9 and the cam plate 24a.

[3] While, in the first and second embodiments described above, gas springs 27 were employed as the biasing means of the assistance torque generation means 21, the use of such gas springs 27 is not to be considered as being necessarily limitative; it would also be possible to employ biasing means of various other types, such as compression springs, hydraulic cylinders, or the like.

[4] While, in Concrete Examples #1 and #2 described above, the shaft balancer mechanisms 20, 20A are employed as indexer devices 1, this structure is not to be considered as being necessarily limitative; the balancer mechanisms could be applied to mechanical devices of various types other than the indexer devices 1.

[5] In addition, for a person skilled in the art, the present invention can be implemented in various different formats by including various other changes to the embodiments described above without deviating from the spirit of the present invention, and the present invention is to be considered as including variant embodiments of this type.

DESCRIPTION OF REFERENCE NUMERALS

W: workpiece
1: indexer device
2: table unit
3: left rotating shaft
4: right rotating shaft
5: left shaft support member
6, 6A: right shaft support members
9: bearing member
11: rotary joint
20, 20A: rotating shaft balancer mechanisms
21: assistance torque generation means
22, 22A: reaction force generation means
24: cam member
25: cam follower member
27: gas spring (biasing means)
35: roller member
37: spring member (biasing member)
42: second cam member
43: second cam follower member
45: gas spring (second biasing means)

The invention claimed is:

1. A balancer mechanism for a rotating shaft for alleviating unbalanced torque acting on the rotating shaft that is freely rotationally supported by a shaft support member via a bearing member, from a member that is supported by the rotating shaft;

wherein there are provided an assistance torque generation device for generating an assistance torque that mutually cancels out at least a part of the unbalanced torque, and a reaction force generation device on an opposite side of the rotating shaft from the assistance torque generation device;

the assistance torque generation device comprising a cam member that is fixed to the rotating shaft, a cam follower member that contacts against and follows the cam member, and a biasing device for applying assistance torque to the rotating shaft via the cam member by biasing the cam follower member toward the cam member; wherein the reaction force generation device is configured for generating a balancing moment on the rotating shaft to mutually cancel out a tilting moment that tilts the rotating shaft, wherein the tilting moment tilts the rotating shaft in a direction away from the assistance torque generation device, around the bearing member as a center, as a result of the biasing force of the biasing device.

2. The balancer mechanism for a rotating shaft according to claim 1, wherein the reaction force generation device comprises a roller member that contacts against and follows the rotating shaft, and a biasing member that elastically biases the roller member toward the rotating shaft.

3. The balancer mechanism for a rotating shaft according to claim 1, wherein the reaction force generation device, comprises a second cam member that is fixed to the rotating shaft, a second cam follower member that contacts against and follows the second cam member, and a second biasing device for biasing the second cam follower member toward the second cam member, and, along with generating the balancing moment, also generates a portion of the assistance torque.

4. The balancer mechanism for a rotating shaft according to any one of claims 1 through 3, wherein the biasing device of the assistance torque generation device comprises a gas spring.

5. The balancer mechanism for a rotating shaft according to claim 4, wherein a rotary joint is housed internally to the rotating shaft.

6. The balancer mechanism for a rotating shaft according to claim 4, wherein the rotating shaft is a rotating shaft that rotatably supports a table unit of an indexer device on which a workpiece is detachably installed.

* * * * *